(12) United States Patent
Azriel et al.

(10) Patent No.: US 9,037,551 B2
(45) Date of Patent: May 19, 2015

(54) REDUNDANT ATTRIBUTE VALUES

(75) Inventors: David Azriel, Tel Aviv (IL); Nimrod Nahum, Netzaney Oz (IL); Nir Mardiks, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 13/413,818

(22) Filed: Mar. 7, 2012

(65) Prior Publication Data

US 2013/0238569 A1    Sep. 12, 2013

(51) Int. Cl.
*G06F 17/30* (2006.01)

(52) U.S. Cl.
CPC ...... *G06F 17/30575* (2013.01); *G06F 17/3015* (2013.01); *G06F 17/30156* (2013.01)

(58) Field of Classification Search
USPC .................................................. 707/706, 723
See application file for complete search history.

(56) References Cited

U.S. PATENT DOCUMENTS

| | | | |
|---|---|---|---|
| 8,290,949 B2* | 10/2012 | Baker et al. | 707/736 |
| 2007/0239700 A1 | 10/2007 | Ramachandran | |
| 2009/0144319 A1 | 6/2009 | Panwar et al. | |
| 2009/0182793 A1* | 7/2009 | Love et al. | 707/206 |
| 2009/0248596 A1 | 10/2009 | Matsumoto et al. | |
| 2010/0179945 A1 | 7/2010 | Rangarajan et al. | |
| 2011/0153558 A1 | 6/2011 | Tubman et al. | |
| 2012/0016837 A1* | 1/2012 | Matsuda et al. | 707/609 |

* cited by examiner

*Primary Examiner* — Hung Q Pham
(74) *Attorney, Agent, or Firm* — Hewlett-Packard Patent Department

(57) ABSTRACT

Aspects of the present disclosure provide techniques that determine whether an attribute value is associated with each configuration item in a plurality of configuration items. If it is determined that the attribute value is associated with each configuration item in the plurality of configuration items, the attribute value is deemed a redundant attribute value.

20 Claims, 4 Drawing Sheets

REDUNDANT ATTRIBUTE VALUES

BACKGROUND

A configuration management database ("CMDB") is a repository of information related to a system, such as an information technology ("IT") system. A CMDB includes details of configuration items ("CIs"), which are structural units thereof. A CI may be an abstract data object that represents an entity belonging to the system. The entity may be an IT resource, such as a server, a database, or other hardware and software elements.

An entity of a computer system may have various attributes associated therewith. For example, if an entity represents server hardware, an attribute may be an operating system attribute of UNIX, an IP address attribute of 164.2.3.4, and a MAC address attribute of 35938a48-a6f5-4865-b996-b68c2ffd01bb. These attributes may be reflected in the CI representing the entity. A CI type may be associated with criteria that may be used to determine whether a CI is of the same type as another CI, whether a CI is actually equal to another CI, or whether a CI is different than another CI. CIs may be associated or merged based on such criteria.

DETAILED DESCRIPTION

As noted above, CI types may be associated with criteria that may be used to associate or merge CIs. However, some CIs are associated with attribute values that are not unique. For example, MAC addresses were once unique, hard-coded values capable of uniquely identifying an entity in a computer network. However, duplicate MAC addresses may now be used on a single network interface, which makes a MAC address unsuitable for unique identification thereof. Such redundant attribute values may lead to CIs being erroneously associated or merged with each other. By way of example, multiple virtual machines in a cloud network may be associated with the same MAC address, however each virtual machine should be acknowledged as separate entities for purposes of configuration management.

In view of the foregoing, aspects of the present disclosure provide a system and method that may determine whether an attribute value is associated with each CI in a plurality of CIs. The plurality of CIs may comprise a number of incoming CIs and a number of stored CIs stored in the configuration management database. If it is determined that the attribute value is associated with each CI in the plurality of CIs, the attribute value may be deemed a redundant attribute value.

Figure 1:
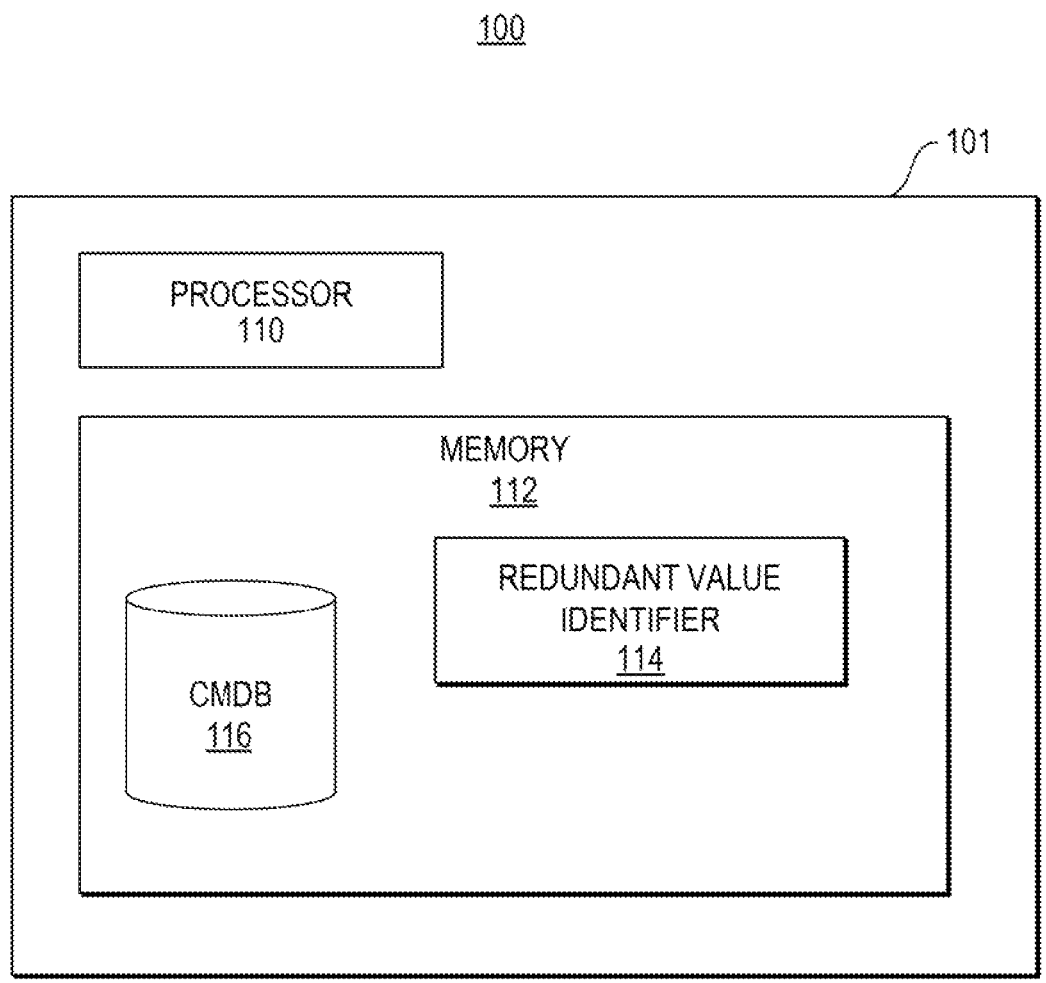
FIG. 1 depicts an illustrative system for implementing the techniques disclosed herein.

FIG. 1 presents a schematic diagram of an illustrative system 100 depicting a computer apparatus 101. Computer apparatus 101 may comprise any device capable of processing instructions and transmitting data to and from other computers, including a laptop, a full-sized personal computer, a high-end server, or a network computer lacking local storage capability. Computer apparatus 101 may include all the components normally used in connection with a computer. For example, it may have a keyboard, a mouse and/or various other types of input devices such as pen-inputs, joysticks, buttons, touch screens, etc., as well as a display, which could include, for instance, a CRT, LCD, plasma screen monitor, TV, projector, etc.

Computer apparatus 101 may be at one node of a network, which may be a local area network ("LAN"), wide area network ("WAN"), the Internet, etc. Such a network and intervening computer devices thereof may also use various protocols including virtual private networks, local Ethernet networks, private networks using communication protocols proprietary to one or more companies, cellular and wireless networks, instant messaging, HTTP and SMTP, and various combinations of the foregoing.

Memory 112 may store redundant value identifier 114, which may be instructions retrievable and executable by processor 110. In one example, memory 112 may be a random access memory ("RAM") device. Alternatively, memory 112 may comprise other types of devices, such as memory provided on floppy disk drives, tapes, and hard disk drives, or other storage devices that may be directly or indirectly coupled to computer apparatus 101. Memory 112 may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Although FIG. 1 functionally illustrates processor 110 and memory 112 as being within the same block, it will be understood that the processor and memory may actually comprise at least one or multiple processors and memories that may or may not be stored within the same physical housing. For example, any one of the memories may be a hard drive or other storage media located in a server farm of a data center. Accordingly, references to a processor, computer, or memory will be understood to include references to a collection of processors, computers, or memories that may or may not operate in parallel.

Memory 112 may also store CMDB 116. The data stored in CMDB 116 may be retrieved, stored, or modified by processor 110. Each of the CIs included in CMDB 116 may represent an entity belonging to a system. Although the architecture of CMDB 116 is not limited to any particular database structure or product, the data may be stored in computer registers, in a relational database as tables having a plurality of different columns and records, XML documents or flat files. In another example, CMDB 116 may be a data stream. The data stored in CMDB 116 may comprise any information sufficient to identify the relevant data, such as numbers, descriptive text, proprietary codes, references to data stored in other areas of the same memory or different memories (including other network locations) or information that is used by a function to calculate the relevant data.

Computer apparatus 101 may be configured as a database server. In this regard, computer apparatus 101 may be capable of communicating data with a client computer such that computer apparatus 101 uses a network to transmit information for presentation to a user of a remote computer. Accordingly, computer apparatus 101 may be used to obtain database information for display via, for example, a web browser executing on a remote computer. Computer apparatus 101 may also comprise a plurality of computers, such as a load balancing network, that exchange information with different computers of a network for the purpose of receiving, processing, and transmitting data to multiple client computers. In this instance, the client computers will typically still be at different nodes of the network than any of the computers comprising computer apparatus 101.

Redundant value identifier 114 may comprise any set of instructions to be executed directly (such as machine code) or indirectly (such as scripts) by the processor(s). In that regard, the terms "instructions," "modules" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative. Functions, methods and routines of redundant value identifier 114 are explained in more detail below.

In one example, redundant value identifier 114 may be realized in any non-transitory computer-readable media for use by or in connection with an instruction execution system such as computer apparatus 101, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

A CI may be associated with at least one attribute and each attribute may be assigned a value. By way of example, if a CMDB represents a computer networking system, a CI stored therein may be associated with a number of attributes commonly found in networking systems, such as an operating system, a network address (e.g., IP, MAC), a hardware identifier (e.g., of a motherboard), a host name, and so forth. These attributes may have values such as "Windows NT," "1.2.3.5," "sar4f43se43fd3," and "Sally's computer," respectively. As noted above, redundant attribute values may cause a plurality of CIs to be associated or merged with each other even when each CI therein should be acknowledged as a separate entity in the CMDB. Invalid associations among CIs may cause unnecessary processing of CIs stored in the CMDB, which diminishes the overall performance thereof.

An incoming CI may refer to a newly introduced or source CI that is to be associated with or merged with one or more existing or stored CIs. Incoming CIs may be compared and associated to existing CIs stored in the CMDB. The comparison between a particular attribute of two CIs, or more particularly, a comparison of values of the attribute that may be meant to identify one CI as potentially being equivalent to another, may be carried out using identification criteria. Identification Criteria may be applied to existing CIs of a CMDB to identify one or more existing CIs that are potentially equivalent to a new incoming CI. Examples of Identification Criteria usable to compare two or more CIs include whether values of hardware identifier attributes are equal, whether a result of a contain operator between values of MAC address attributes returns "true," whether host name attribute values are equal, and whether a result of a contain operator between IP address attribute values returns "true."

In another example, a sequence of attributes may be included for comparison in Match Resolution Criteria. One illustrative sequence may be serial number first, followed by MAC address (again, to satisfy a contain operator), followed by host name. A CI may have any number of attributes with values that may be compared to values of corresponding attributes of other CIs. For example, a first attribute of a CI may be an IP address. Thus, comparing a first attribute of one CI to a corresponding first attribute of another CI may include comparing the IP address of the one CI to the corresponding IP address of the other CI. Comparing attributes of CIs may include comparing values of the attributes in order to determine whether there is a match. A "match" may occur where the attribute values are equal, where they satisfy a contain operator, or where they satisfy some other operator.

A comparison of CI attribute values may yield various results. Attribute values may "match" when a comparison between them satisfies a particular type of operator, such as equals or contains. In contrast, attribute values may "mismatch" where they conflict, such as by having values that are different or that fail various comparison operators. A third result may occur where a CI involved in a comparison has an attribute value that is empty. An attribute may have an empty value where the attribute value is unpopulated, was never populated, is NULL (e.g., 0x0, NUL, /dev/null or a null pointer), is equal to 0 or "N/A," and so forth. An empty attribute may not be helpful in determining whether CIs are equivalent, and so additional CI attributes may be compared.

Figure 2:
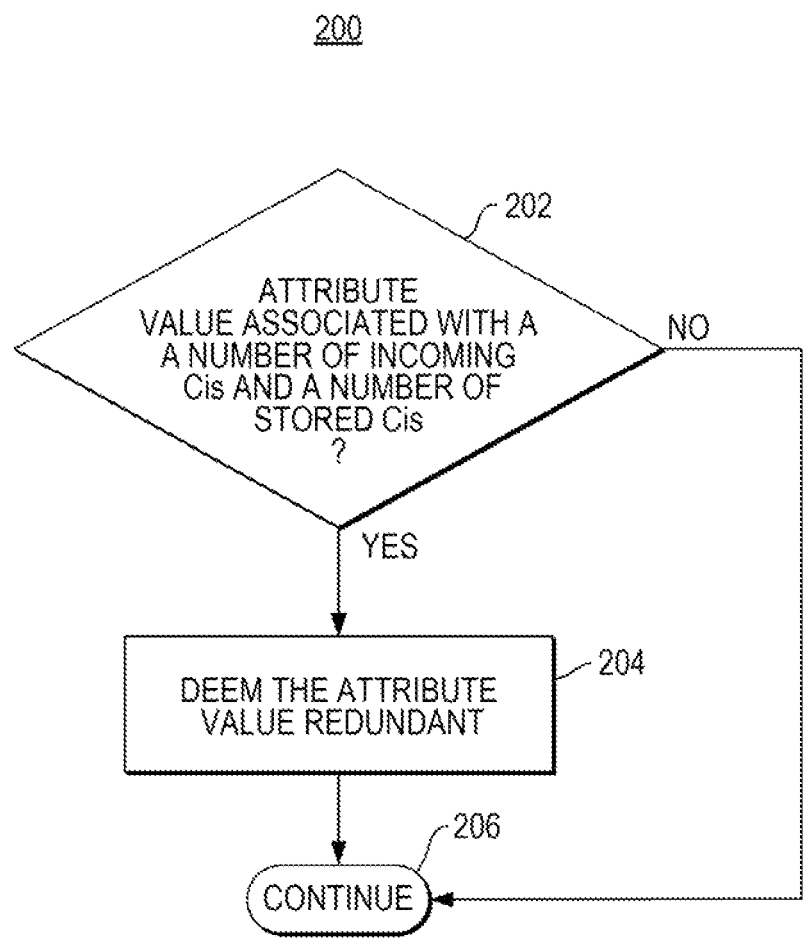
FIG. 2 is a flow diagram of an illustrative process in accordance with aspects of the present disclosure.
Figure 3:
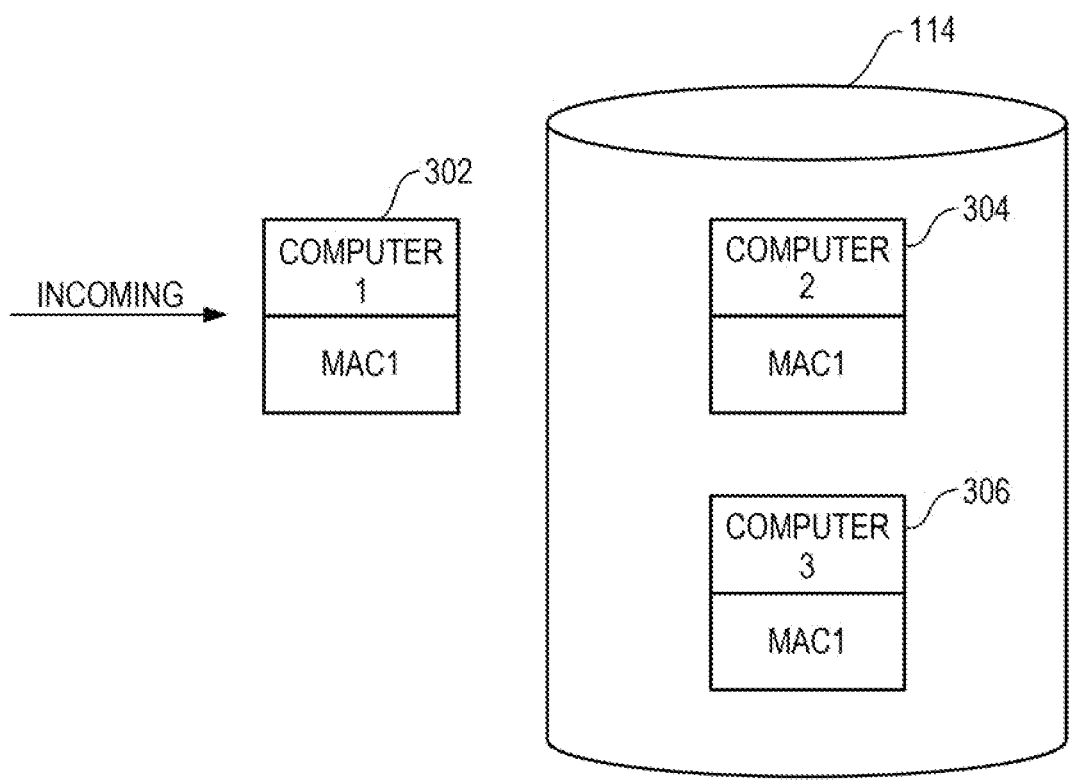
FIG. 3 is a working example of configuration items associated with redundant attribute values.
Figure 4:
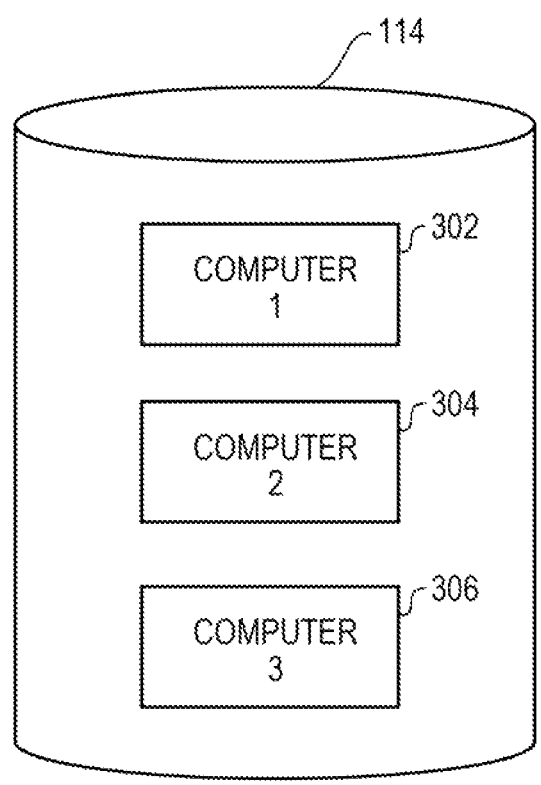
FIG. 4 is a further working example that demonstrates the detection of redundant attribute values.

One working example of a system and method to identify redundant attribute values is illustrated in FIGS. 2-4. In particular, FIG. 2 illustrates a flow diagram in accordance with aspects of the present disclosure. FIGS. 3 and 4 show various aspects of identifying redundant attribute values associated with CIs. The actions shown in FIGS. 3 and 4 will be discussed below with regard to the flow diagram of FIG. 2.

As shown in block 202 of FIG. 2, it may be determined whether an attribute value is associated with each CI in a plurality of CIs that comprises a number of incoming CIs and a number of stored CIs stored in the configuration management database. The working example of FIG. 3 shows an incoming CI 302 that represents an entity of a computer network. In particular, the entity is a computer named "computer 1." Furthermore, CMDB 116 is shown having two stored CIs 304 and 306 that each represent "computer 2" and "computer 3" respectively. Each CI shown in FIG. 3 is associated with a MAC attribute value of "MAC1." In FIG. 3, "MAC1" is associated with one incoming CI 302 and two stored CIs 304 and 306.

Referring back to FIG. 2, if it is determined that the attribute value is associated with each CI in the plurality of CIs, the attribute value may be deemed redundant, as shown in block 204. In one example, each redundant attribute value associated with a CI in the plurality of CIs that is an incoming CI may be flagged such that each flagged attribute value associated therewith is subsequently ignored. In a further example, each redundant attribute value associated with a CI in the plurality of CIs that is a stored CI may be removed from the CMDB. In yet a further example, a sum of the number of incoming CIs and the number of stored CIs may exceed a predetermined threshold. The predetermined, threshold may be configurable and may be based on a type of the attribute value. The predetermined threshold may be consistent with an administrative policy. For example, an administrative policy may be, that a networking system can have a maximum of two redundant MAC addresses such that exceeding that threshold would cause any MAC address equivalent thereto to be subsequently ignored. In another example, the number of incoming CIs may exceed a predetermined threshold. In this scenario, the attribute value associated with the incoming CIs would be a value that does not exist in the CMDB, but that still exceeds the predetermined threshold nonetheless. The process may continue in block 206 such that more CIs may be analyzed or, if no other CIs exist, the process may terminate.

Referring now to FIG. 4, CIs 302, 304, and 306 are shown stored in CMDB 116 without the MAC address. In the example of FIGS. 3-4, the threshold for duplicate MAC addresses is two. CIs 302, 304, and 306 are each acknowledged as separate entities in the CMDB. That is, the CIs are not associated with each other or are not merged. Advantageously, the foregoing system and method removes redundant attribute values from a CMDB. In this regard, the performance of the CMDB and any processing thereof is enhanced.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:

1. A system comprising:
a configuration management database for storing configuration items, each configuration item being associated with at least one attribute value of an entity, the entity belonging to a computer information system;
a processor;
instructions which, if executed, causes the processor to:
determine whether an attribute value is associated with each configuration item in a plurality of configuration items, the plurality of configuration items comprising a number of incoming configuration items and a number of stored configuration items stored in the configuration management database;
if it is determined that the attribute value is associated with each configuration item in the plurality of configuration items, deem the attribute value a redundant attribute value; and
in response to a determination that the attribute value is redundant and a sum of the number of incoming configuration items and the number of stored configuration items exceeds a predetermined threshold, flagging the redundant attribute value as an attribute value to be ignored.

2. The system of claim 1, wherein the predetermined threshold is based on a type of the attribute value.

3. The system of claim 1, wherein the instructions, if executed, further causes the processor ignore each flagged attribute value.

4. The system of claim 1, wherein the instructions, if executed, further causes the processor to remove each redundant attribute value associated with a stored configuration item from the configuration management database.

5. The system of claim 1, wherein determining whether the attribute value is associated with each configuration item in the plurality of configuration items includes an analysis of at least one of hardware identifier attributes, MAC address attributes, host name attributes, and IP address attributes.

6. The system of claim 1, wherein determining whether the attribute value is associated with each configuration item in the plurality of configuration items includes an analysis of a sequence of the at least one attribute value.

7. The system of claim 1, wherein the instructions cause the processor to remove the flagged redundant attribute value from the configuration management database.

8. A non-transitory computer readable medium having instructions stored therein, which if executed, cause at least one processor to:
determine whether an attribute value is associated with each configuration item in a plurality of configuration items, the plurality of configuration items comprising a number of incoming configuration items and a number of stored configuration items stored in a configuration management database, each configuration item representing an entity of a system; and
in response to a determination that the attribute value is associated with each configuration item in the plurality of configuration items and that a sum of the number of incoming configuration items and the number of stored configuration items exceeds a predetermined threshold, flag the attribute value as a redundant attribute value to be ignored.

9. The non-transitory computer readable medium of claim 8, wherein the predetermined threshold is configurable.

10. The non-transitory computer readable medium of claim 8, wherein the predetermined threshold is based on a type of the attribute value.

11. The non-transitory computer readable medium of claim 8, wherein the instructions stored therein, if executed, further causes the processor to ignore the flagged attribute value.

12. The non-transitory computer readable medium of claim 8, wherein the instructions stored therein, if executed, further causes the processor to remove each redundant attribute value associated with a stored configuration item from the configuration management database.

13. The non-transitory computer readable medium of claim 8, wherein determining whether the attribute value is associated with each configuration item in the plurality of configuration items includes an analysis of at least one of hardware identifier attributes, MAC address attributes, host name attributes, and IP address attributes.

14. The non-transitory computer readable medium of claim 8, wherein determining whether the attribute value is associated with each configuration item in the plurality of configuration items includes an analysis of a sequence of a plurality of attribute values associated with each configuration item, the plurality of attribute values including the attribute value.

15. A computer-implemented method comprising:
determining, via a processor, whether an attribute value is associated with each configuration item in a plurality of configuration items, the plurality of configuration items comprising a number of incoming configuration items and a number of stored configuration items stored in a configuration management database, each configuration item representing an entity of a system; and
in response to a determination that the attribute value is associated with each configuration item in the plurality of configuration items and that a sum of the number of incoming configuration items and the number of stored configuration items exceeds a predetermined threshold, flagging, via the processor, the attribute value as a redundant attribute value to be ignored.

16. The computer-implemented method of claim 15, wherein the predetermined threshold is configurable.

17. The computer-implemented method of claim 15, wherein the predetermined threshold is based on a type of the attribute value.

18. The computer-implemented method of claim 15 further comprising ignoring the flagged attribute value.

19. The computer-implemented method of claim 15 further comprising: removing each redundant attribute value associated with a stored configuration item from the configuration management database.

20. The computer-implemented method of claim 15, wherein determining whether the attribute value is associated with each configuration item in the plurality of configuration items includes an analysis of a sequence of a plurality of attribute values associated with each configuration item, the plurality of attribute values including the attribute value.

* * * * *